(12) United States Patent
Gale et al.

(10) Patent No.: US 6,672,688 B2
(45) Date of Patent: Jan. 6, 2004

(54) ANTI-LOCK BRAKING SYSTEM MODULE FOR AIRCRAFT EQUIPPED WITH MASTER CYLINDER BRAKE SYSTEMS

(75) Inventors: Allen R. Gale, South Bend, IN (US); Jeffrey K. Arnold, South Bend, IN (US); Allan W. Blunt, Granger, IN (US); Leo H. McWilliams, Granger, IN (US)

(73) Assignee: Honeywell International Inc., Morristown, NJ (US)

( * ) Notice: Subject to any disclaimer, the term of this patent is extended or adjusted under 35 U.S.C. 154(b) by 6 days.

(21) Appl. No.: 10/054,048

(22) Filed: Jan. 22, 2002

(65) Prior Publication Data

US 2002/0175562 A1 Nov. 28, 2002

Related U.S. Application Data

(60) Provisional application No. 60/292,637, filed on May 22, 2001.

(51) Int. Cl.$^7$ .................................................. B60T 8/86
(52) U.S. Cl. ......................... 303/126; 303/3; 303/166; 303/113.1
(58) Field of Search ........................ 303/22.4, 126, 303/3, 166, 15, 167, 113.1, 116.1

(56) References Cited

U.S. PATENT DOCUMENTS

| | | | | |
|---|---|---|---|---|
| 2,515,729 A | | 7/1950 | Morrison | 244/111 |
| 2,874,810 A | | 2/1959 | Brown | |
| 2,937,051 A | | 5/1960 | Highley | 303/21 |
| 2,947,579 A | | 8/1960 | Woodwowrth | 303/24 |
| 2,959,012 A | * | 11/1960 | Johnson | 60/538 |
| 3,006,695 A | | 10/1961 | Woodworth | 303/24 |
| 3,275,384 A | | 9/1966 | Hirzel | 303/21 |
| 3,361,487 A | * | 1/1968 | Vidend | 303/61 |
| 3,711,163 A | | 1/1973 | Booher | 303/21 |
| 3,920,282 A | | 11/1975 | DeVlieg | 303/21 |
| 3,934,940 A | * | 1/1976 | Schnaibel | 303/123 |
| 4,076,331 A | | 2/1978 | DeVlieg | |
| 4,269,455 A | | 5/1981 | Beck | 303/106 |
| 4,822,113 A | | 4/1989 | Amberg et al. | |
| 5,024,491 A | * | 6/1991 | Pease, Jr. et al. | 303/195 |
| 5,050,940 A | | 9/1991 | Bedford et al. | |
| 5,411,323 A | | 5/1995 | Takahashi et al. | |
| 5,445,445 A | | 8/1995 | Yukio | |
| 5,456,523 A | | 10/1995 | Boehringer | |
| 5,458,405 A | * | 10/1995 | Watanabe | 303/173 |
| 5,463,551 A | * | 10/1995 | Milunas | 701/91 |
| 6,142,585 A | * | 11/2000 | Gowan et al. | 303/126 |
| 6,193,326 B1 | | 2/2001 | Ybert | 303/15 |
| 6,343,844 B1 | * | 2/2002 | McCann et al. | 303/122.02 |

FOREIGN PATENT DOCUMENTS

| | | | | |
|---|---|---|---|---|
| EP | 0 909 689 A | 4/1999 | | |
| GB | 2 209 572 A | 5/1989 | | B60T/17/22 |

* cited by examiner

*Primary Examiner*—Christopher P. Schwartz
*Assistant Examiner*—Devon Kromer
(74) *Attorney, Agent, or Firm*—Larry J. Palguta

(57) ABSTRACT

A combination brake and anti-lock system for a wheeled vehicle such as an aircraft includes an operator controlled source of pressurized hydraulic fluid for selectively applying hydraulic pressure to a hydraulically actuated wheel rotation braking device which responds to the applied hydraulic pressure to apply a braking force to a wheel of the vehicle to thereby arresting wheel motion. There is a low pressure hydraulic fluid return with a normally open hold valve in circuit between the source and the braking device for selectively opening and closing a fluid flow path from the source to the braking device and a normally closed decay valve in circuit between the braking device and the return for selectively opening and closing a fluid flow path from the braking device to the return. A wheel speed sensing device provides an indication of the rotational speed of the wheel and a valve control responds to an indication of a skid indicative wheel speed irregularity from the sensing device to close the normally open valve and open the normally closed valve. The valve control may be disabled manually by an operator on command or automatically upon detecting an anti-skid malfunction.

10 Claims, 4 Drawing Sheets

ANTI-LOCK BRAKING SYSTEM MODULE FOR AIRCRAFT EQUIPPED WITH MASTER CYLINDER BRAKE SYSTEMS

CROSS REFERENCE TO RELATED APPLICATIONS

This application claims the benefit of U.S. Provisional Patent Application No. 60/292,637, filed May 22, 2001, and entitled ANTI-LOCK BRAKING SYSTEM MODULE FOR AIRCRAFT EQUIPPED WITH MASTER-CYLINDER BRAKE SYSTEMS.

FIELD OF THE INVENTION

This invention relates to brake systems, and more particularly to providing an anti-skid feature in master cylinder actuated braking systems.

BACKGROUND OF THE INVENTION

Most land-based vehicles employ a single braking control for actuating the brakes. Aircraft, on the other hand, commonly utilize the brakes both for stopping the aircraft and for directional control and therefore employ independent left and right brake controls. Also, many aircraft have dual controls resulting in four different brake controls. Vehicle anti-lock braking systems are common in both land-based vehicles and aircraft. Typically, the anti-lock systems, if present, come as original equipment on the vehicle. A typical aircraft brake control system has many components to mount and connect hydraulically. It would typically need a communications interface to a central computer and often, as in brake by wire systems, needs to sense brake pedal travel. In addition, a typical brake control system normally operates on an aircraft with central hydraulics system having supply and return lines. These systems are relatively sophisticated, complex and expensive. Modification of a vehicle lacking anti-lock braking to incorporate an anti-lock feature is sufficiently complex and costly that it is rarely attempted. Moreover, since current aircraft anti-lock features are an integral part of the aircraft brakes, anti-lock failure is generally accompanied by brake failure.

A low cost, light weight, relatively simple anti-lock system suitable as original equipment or for retrofitting existing vehicles would be desirable, particularly for aircraft applications. It is also desirable to provide an aircraft braking system anti-lock feature where anti-lock failure is not accompanied by general failure of the braking system.

SUMMARY OF THE INVENTION

The present invention provides solutions to the above problems by adding anti-skid/anti-lock capability to aircraft equipped with master-cylinder or similar type stand-alone, manually operated braking systems, at a reasonable cost and without requiring major modification to the aircraft systems.

The present invention represents a departure in design and approach from existing aircraft anti-lock/anti-skid systems. The main differences are that the system is an add-in which augments the brake system functionality whereas existing systems are integral to the brake system. Existing systems require more extensive modification to the aircraft to add the functionality to existing units. The failure mode of the present invention is to revert to normal braking, thereby not depriving the pilot of braking ability. If there is a question as to the status or performance of the anti-lock portion of the system, it can be disabled by a single cockpit switch, having no further effect on the brakes.

The principle differences of the present invention as compared to other aircraft anti-skid units are lower cost, smaller size and parallel operation which defaults to normal braking while existing systems are integral and default to loss of function.

The invention comprises, in one form thereof, a technique for retrofitting an aircraft braking system of the type having two independently operable hydraulic braking circuits, each having a master cylinder for selectively supplying pressurized hydraulic fluid to a corresponding brake actuating mechanism to incorporate an anti-skid feature. The technique includes the introduction of two pair of valves, one pair into each of the two hydraulic braking circuits between the master cylinder and corresponding brake actuating mechanism. The first valve of each pair normally provides a fluid path between a master cylinder and corresponding actuating mechanism for normal braking and is operable during anti-skid operation against spring bias to block the fluid path between the master cylinder and actuating mechanism when a skid condition of an aircraft wheel is sensed by a system which indicates the aircraft wheel speeds. The second valve of each pair is normally closed and opens against spring bias to vent pressurized fluid from the corresponding actuating mechanism to a sump relieving the braking force during anti-skid operation. A pilot operable control and/or an anti-skid error sensing circuit may be provided for selectively disabling the electronic interconnection to fix all pairs of valves in their normal conditions hydraulically coupling the master cylinders to their respective brake actuating mechanisms thereby disabling the anti-skid feature. For enhanced reliability, for example, in the event one of the valves sticks in one position, two further pair of valves may be introduced, one further pair in parallel with a corresponding pair in each of the hydraulic circuits, and a pair of pressure actuated shuttle valves provided, each coupling one of each parallel valve pair to the corresponding actuating mechanism so as to select and pass the higher of two braking pressures applied to the shuttle valve inlets.

Also in general, a combined brake and anti-lock system for a wheeled vehicle has an operator controlled source of pressurized hydraulic fluid and a hydraulically actuated wheel rotation braking device which responds to applied hydraulic pressure to apply a braking force to a wheel of the vehicle to arrest wheel motion. A normally open hold valve is connected in the circuit between the source and the braking device for selectively opening and closing a fluid flow path from the source to the braking device. A normally closed bleed valve is connected in the circuit between the braking device and a low pressure hydraulic fluid return for selectively opening and closing a fluid flow path from the braking device to the return during anti-skid operation. A wheel speed sensing device provides an indication of the rotational speed of the wheel and a valve control is responsive to an indication of a skid indicative wheel speed irregularity from the sensing device to close the normally open hold valve and open the normally closed bleed valve to relieve braking force. There may be an operator control and/or malfunction sensor for disabling the valve control to allow anti-lock-free braking.

An advantage of the present invention is that no major modification of an existing brake system is required when incorporating an anti-lock feature.

Another advantage of the present invention is that both equipment and installation costs of adding an anti-lock feature are modest.

A further advantage is that the aircraft's normal braking system is retained in its original capability and failure of the anti-lock system reverts to normal braking.

DESCRIPTION OF THE INVENTION

Figure 1:
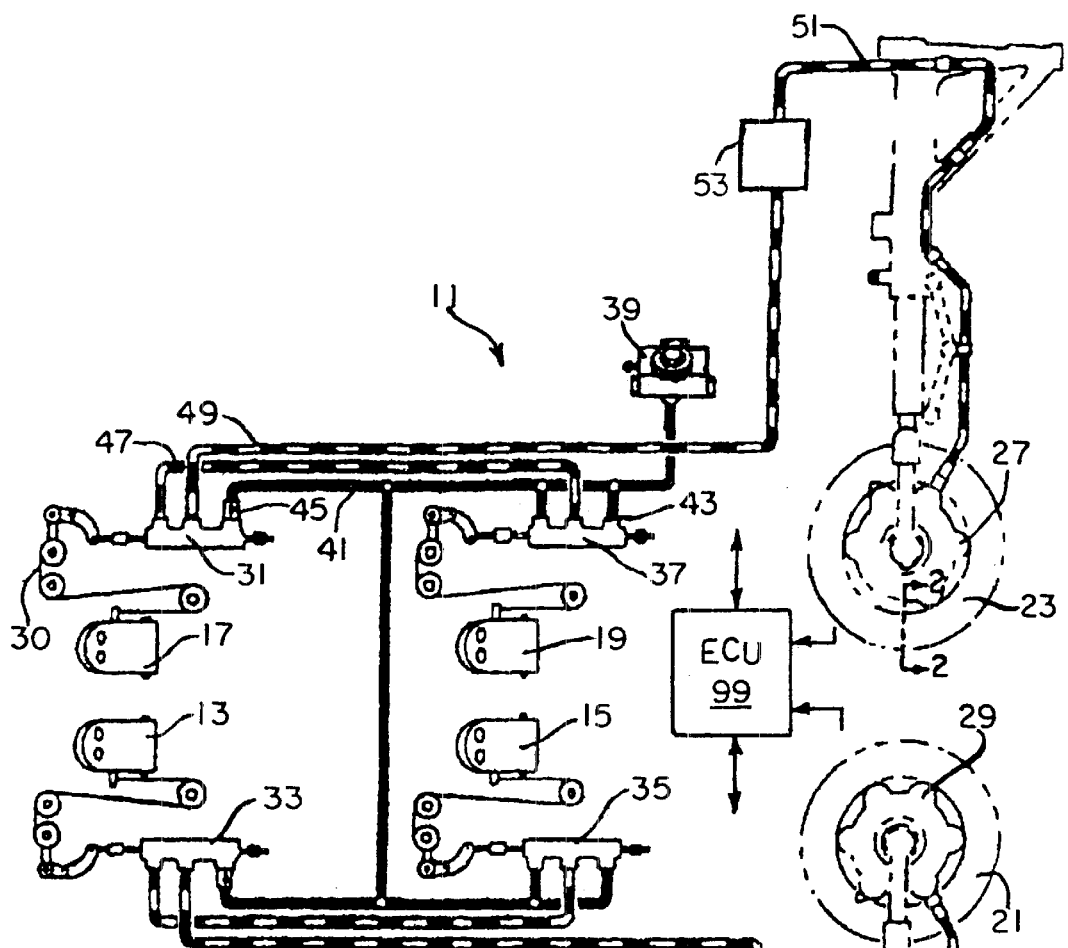
FIG. 1 is a schematic illustration of the present invention applied to an aircraft braking system.
Figure 2:
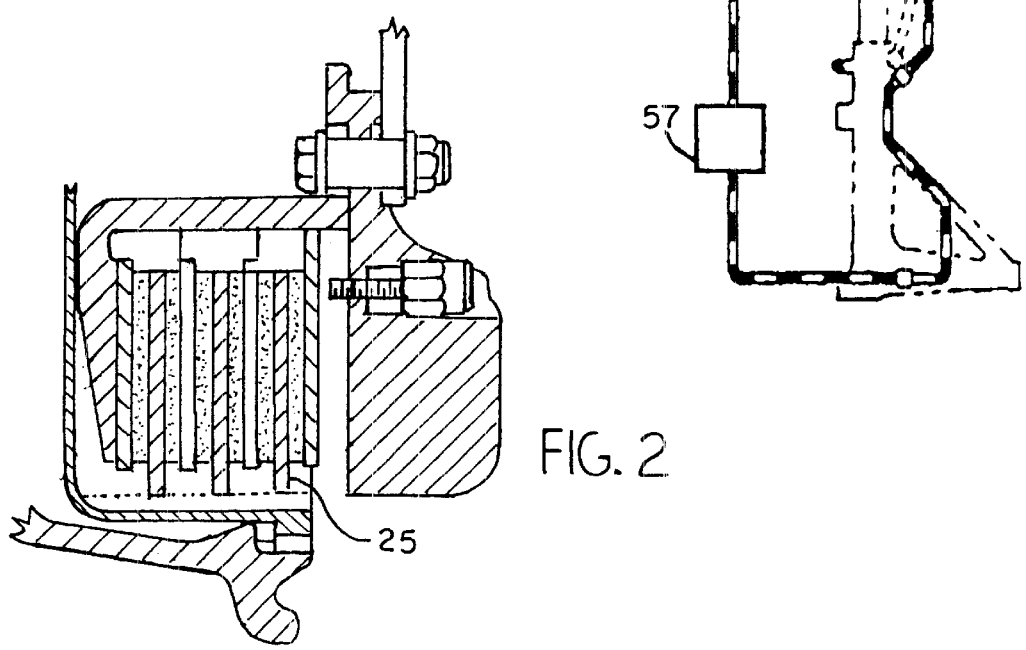
FIG. 2 is a view taken along view line 2—2 of FIG. 1.

In FIG. 1, a braking system 11 for an aircraft or similar vehicle incorporating an anti-lock feature is shown schematically. The illustrated aircraft has dual controls, each having independently actuable left 13 and 15, and right 17 and 19 brake pedals for braking left 21 or right 23 aircraft wheels. The braking force is applied by supplying hydraulic pressure to compress an interleaved stack of alternately fixed and rotatable brake disks 25 as shown in FIG. 2. Each wheel has a wheel speed sensing arrangement 27 or 29 which supplies an electronic, optical or similar indication of the rotational speed (angular velocity) of the corresponding wheel. Wheel hubcap mounted permanent magnets and a sensing coil fixed to the axle adjacent the hubcap in which a series of pulses are induced as the wheel rotates or other electromechanical or optical arrangements may be used. A cable or other mechanical linkage such as 30 couples the brake pedal 17 to a corresponding master cylinder 31. Pedals 13, 15, and 19 are similarly coupled to actuate master cylinders 33, 35 and 37 respectively. Hydraulic fluid from a brake reservoir 39 is supplied by way of hydraulic lines such as 41 to master cylinder inlets such as 43 and 45. When a brake pedal is depressed and the corresponding master cylinder actuated, pressurized fluid is supplied to apply braking force to a wheel. For example, depressing pedal 19 causes pressurized fluid from master cylinder 37 to compress the right wheel 23 disk brake stack 25 by way of lines 47, 49 and 51. Except for the wheel speed sensing arrangement 27 or 29, the system of FIG. 1, as thus far described, is conventional.

Figure 3A:
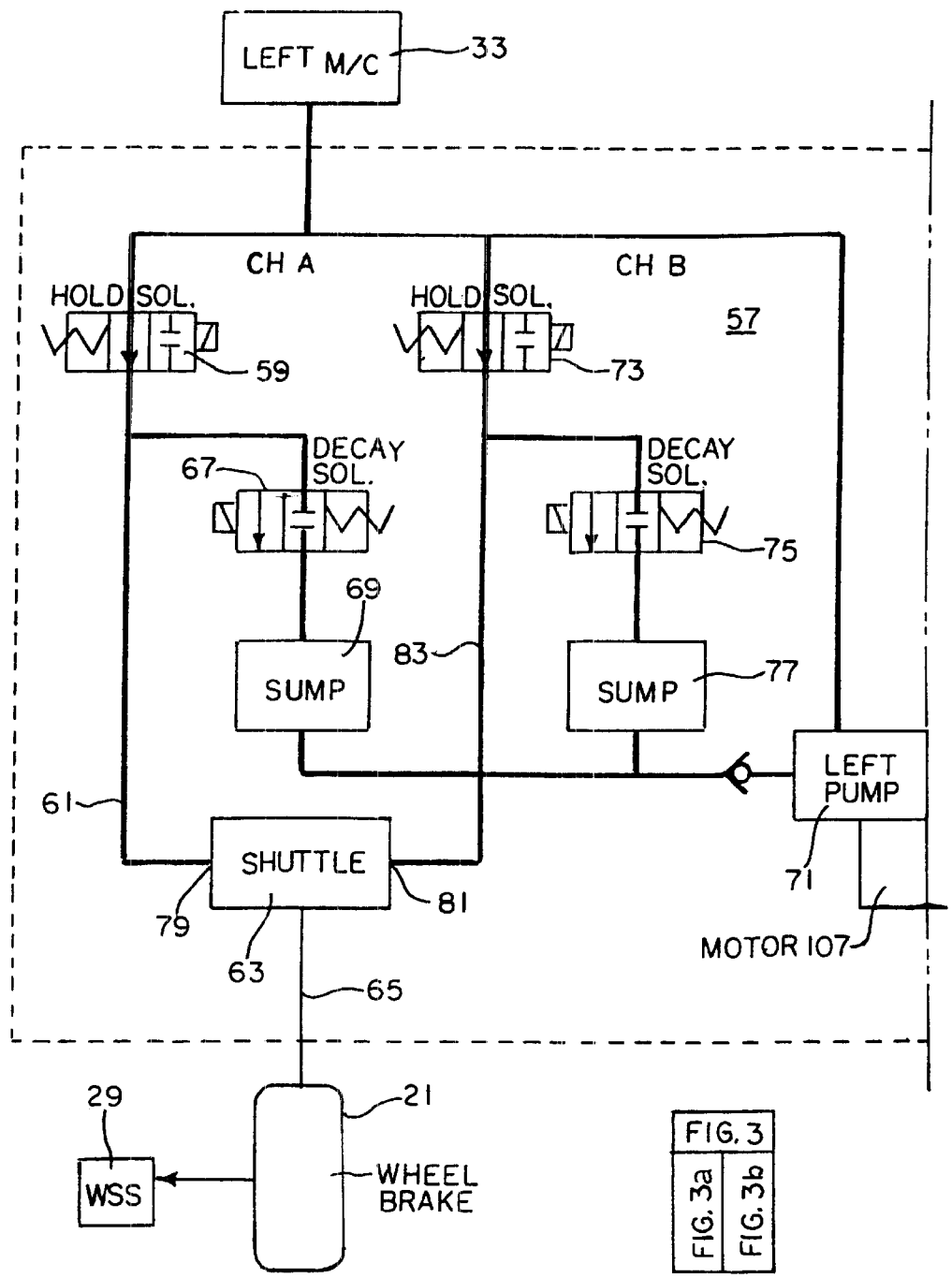
FIGS. 3a and 3b are a hydraulic schematic illustration of the present invention.
Figure 3B:
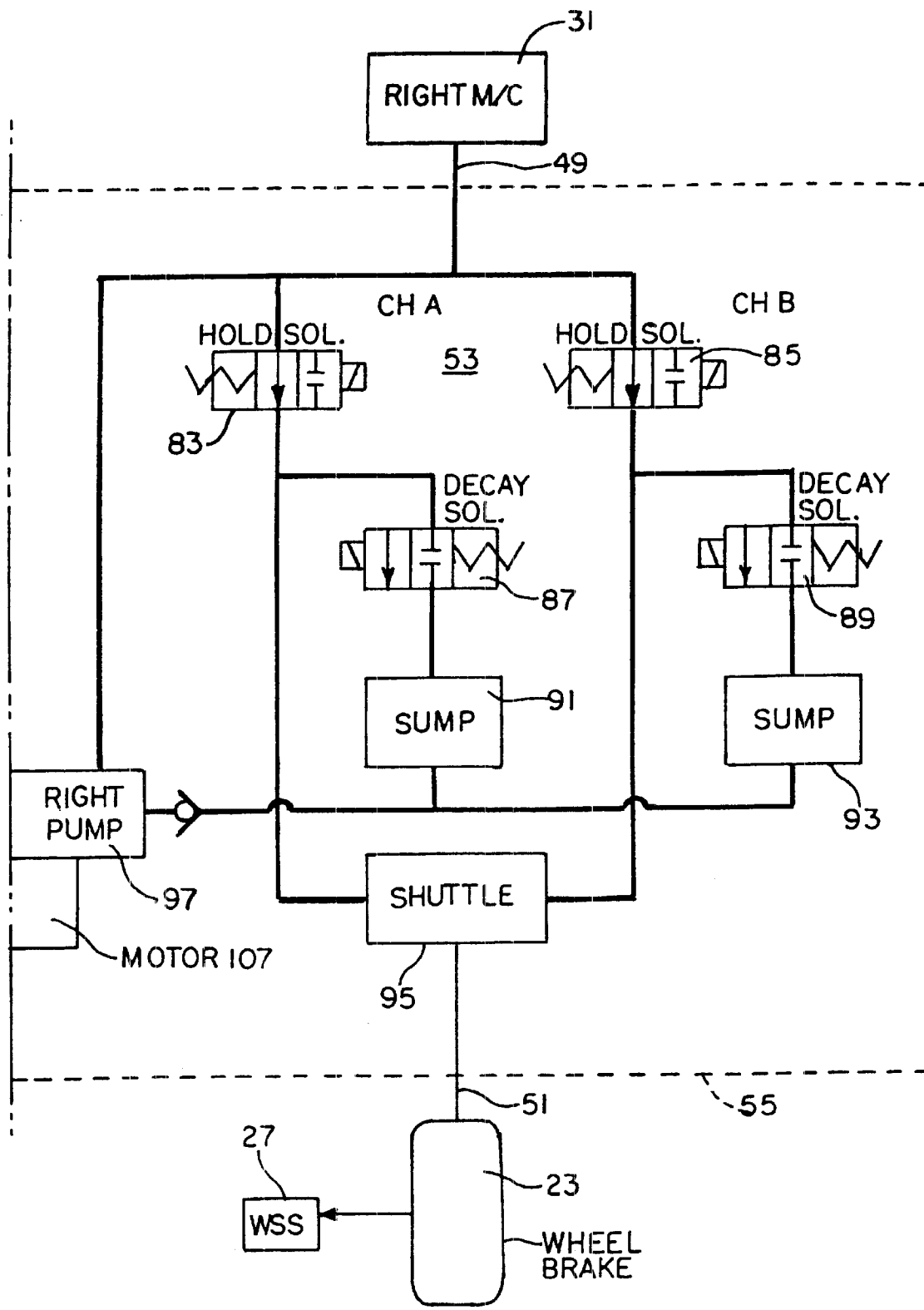

Hydraulic lines 49 and 51 are coupled together by the right half 53 of the hydraulic anti-lock braking module 55 of FIG. 3. The left half 57 of module 55 similarly interconnects master cylinder 33 and the brake actuating mechanism for wheel 21. In FIG. 3 during normal braking, when a left brake pedal 13 or 15 is depressed, hydraulic pressure is supplied from the master cylinder 33 through the solenoid actuated hold valve 59, line 61, pressure actuated shuttle valve 63 and line 65 to actuate the braking device of wheel 21. When an inappropriate wheel speed from sensor 29 indicates a skid condition, the normally open hold valve 59 is energized to close and the normally closed decay valve 67 is actuated to open relieving braking pressure by routing hydraulic fluid through the low pressure return of sump 69 and pump 71 back to the master cylinder 33. There is a second hold valve 73, a second decay valve 75 and a second sump 77 connected in parallel with the valves 59 and 67, and sump 69 by the shuttle valve 63. Shuttle valve 63 passes the higher of the pressures at inlets 79 and 81 to line 65. Valves 59 and 73 are energized and de-energized simultaneously as are valves 67 and 75. During normal braking, the higher of the pressures on lines 61 and 83 determines the braking force on wheel 21. If one of the valves 59 or 67 in Channel A should become stuck in its energized (anti-lock) position, the brakes could fail, however, the shuttle valve 63 responds to this failure to select the channel with the highest hydraulic pressure and selects Channel B for continued braking operation. Thus, the A and B channels in combination with the shuttle valve 63 allow for pressure to get to the brake even with a failed, e.g. stuck valve on one channel. This provides an extra measure of safety against a loss of brakes condition. The right half 53 of the hydraulic module 55 includes solenoid operated hold valves 83 and 85, solenoid operated decay valves 87 and 89, sumps 91 and 93, a pressure responsive shuttle valve 95 and pump 97 all of which operate in the same way as their counterparts in the left half 57.

Figure 4:
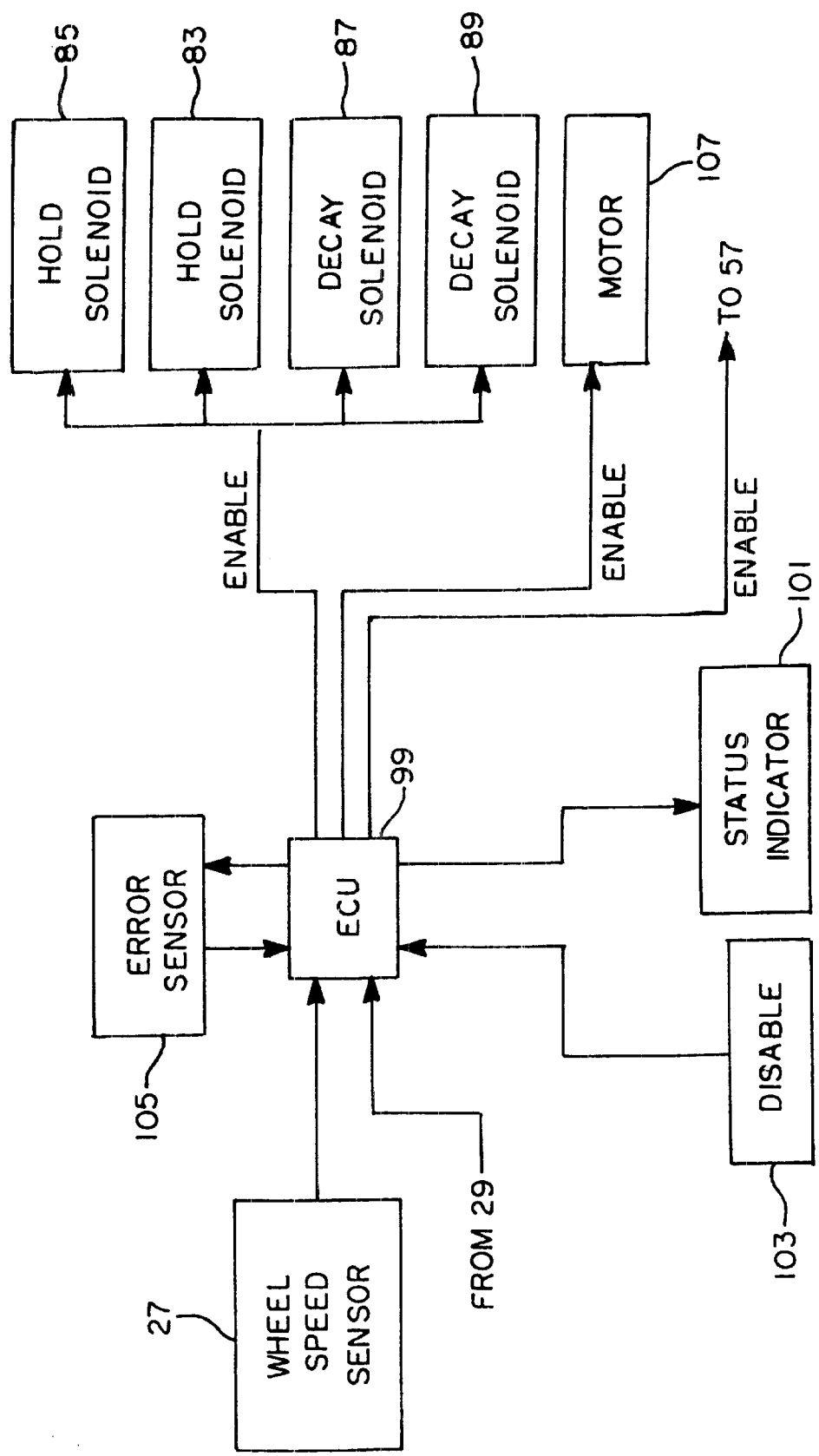
FIG. 4 is a simplified schematic illustration of an electronic control for one wheel of FIGS. 3a and 3b.

FIG. 4 illustrates electronic control for the right hand braking portion of FIGS. 1 and 3. An electronic control unit 99 provides braking information to the pilot or other vehicle operator on a status indicator 101 and gives that operator the option of actuating control 103 to disable the anti-skid feature. These elements may be shared by the left hand braking portion. The electronic control unit 99 also receives wheel speed information from sensor 27 and provides enabling signals to the hold 83 and 85, and decay 87 and 89 solenoids to operate the corresponding valves. When an inappropriate wheel speed indication is received, e.g., suddenly too slow indicative of a skid, the enable signals become active. The enable signals may continue until the wheel speed resumes an acceptable level, or be otherwise appropriately controlled according to conventional anti-skid techniques. An automatic error sensing circuit 105 is also provided. This circuit monitors the health of the system and will shut off the anti-lock function for detected problems such as wheel speed sensor malfunction, valve failures, pump or motor failure, and internal controller failures. If such a failure is detected, circuit 105 removes the enable signals, all eight solenoid actuated valves of FIG. 3 are allowed to resume their normal (spring biased) conditions, and disables anti-lock braking, but normal braking is not effected.

The pump motor 107 is activated and pumps 71 and 97 are actuated when either wheel begins anti-lock control. The running of the pump/motor assembly has no effect on the other wheel as there will be little if any fluid to pump from the sump to the master cylinder and what little fluid may be pumped to the master cylinder will not create any additional brake pressure. While the motor control is common, the valve control signals are separate. The solenoid enable signals from electronic control 99 for the left hand braking portion 57 are, of course, responsive to wheel speed sensor 29.

Thus, FIGS. 3 and 4 illustrate generally a combined brake and anti-skid system for a wheeled vehicle which includes an operator controlled source of pressurized hydraulic fluid in the form of master cylinders 31, 33, 35 and 37, several hydraulically actuated wheel rotation braking devices such as 25 which respond to applied hydraulic pressure to apply a braking force to a wheel of the vehicle to arrest wheel motion. The system is modular, with the electronic control unit 99 being the system control. The anti-lock braking system ("ABS") module 55 is self contained and consists of the anti-lock valves, pumps and accumulators and is installed between the master cylinders and the brakes. An interface module (not shown) may contain relays and connections to interface to the aircraft systems and a power supply. Software to operate the system resides in the electronic control unit 99. Wheel speed sensors 27 and 29 are located at the respective wheels.

In summary, the present invention provides a modular, self-contained system which adds anti-lock functionality without making major modifications to the aircraft. It consists of a self-contained hydraulic unit 55 which can be installed between the master cylinder and the brake, an electronic control unit 99 which can be co-located or located remotely, and a cockpit-mounted status indicator 101 with power switch 103, allowing pilot intervention by defeating the system, thereby reverting to normal braking with no other effect on aircraft operation. The aircraft's normal braking system is retained in its original capability and failure of the anti-lock system reverts to normal braking. The proposed system is intended primarily for older/smaller aircraft which do not use high pressure, central hydraulic systems to power the brakes. It is designed to work with a manual, master-cylinder powered brake system.

Alternate embodiments may be devised without departing from the spirit or the scope of the invention.

What is claimed is:

1. A combined brake and anti-lock system for a wheeled vehicle comprising:
   an operator controlled source of pressurized hydraulic fluid having a master cylinder;
   a hydraulically actuated wheel rotation braking device which responds to applied hydraulic pressure to apply a braking force to a wheel of the vehicle to arrest wheel motion;
   a low pressure hydraulic fluid return;
   first and second anti-lock braking modules including a normally open valve between the operator-controllable source master cylinder and the braking device for selectively opening and closing a fluid flow path from the source master cylinder to the braking device;
   a normally closed valve between the braking device and the return for selectively opening and closing a fluid flow path from the braking device to the return;
   a wheel speed sensing device providing an indication of the rotational speed of the wheel;
   a valve control responsive to an indication of a skid indicative wheel speed irregularity from the sensing device to close the normally open valve and open the normally closed valve; and
   means for disabling the valve control to allow anti-lock-free braking.

2. The combined brake and anti-lock system for a wheeled vehicle as set forth in claim 1, wherein the means for disabling comprises an operator actuable control.

3. The combined brake and anti-lock system for a wheeled vehicle as set forth in claim 1, wherein the means for disabling comprises an error sensing circuit for monitoring anti-lock system operation.

4. The combined brake and anti-lock system for a wheeled vehicle as set forth in claim 1, further comprising:
   a second operator controlled source of pressurized hydraulic fluid;
   a second hydraulically actuated wheel rotation braking device which responds to applied hydraulic pressure to apply a braking force to a second wheel of the vehicle to arrest wheel motion;
   a second low pressure hydraulic fluid return;
   a second normally open valve between the second source and the second braking device for selectively opening and closing a fluid flow path from the second source to the second braking device;
   a second normally closed valve between the second braking device and the second return for selectively opening and closing a fluid flow path from the second braking device to the second return;
   a second wheel speed sensing device providing an indication of the rotational speed of the second wheel; and
   a second valve control responsive to an indication of a skid indicative wheel speed irregularity from the second sensing device to close the second normally open valve and open the second normally closed valve; the means for disabling operable to disable both the valve control and second valve control to allow anti-lock-free braking.

5. The combined brake and anti-lock system for a wheeled vehicle as set forth in claim 4, further comprising a first hydraulic pump between the low pressure fluid return and the operator controlled source of pressurized hydraulic fluid, a second hydraulic pump between the second low pressure fluid return and the second operator controlled source of pressurized hydraulic fluid, and a common motor for simultaneously driving the first and second pumps upon the occurrence of an indication of a skid indicative wheel speed irregularity from the either the first sensing device or the second sensing device.

6. A combined brake and anti-lock system for a wheeled vehicle comprising:
   an operator controlled source of pressurized hydraulic fluid having at least one master cylinder;
   a hydraulically actuated wheel rotation braking device which responds to applied hydraulic pressure to apply a braking force to a wheel of the vehicle to arrest wheel motion;
   a shuttle valve having first and second inlets and an outlet connected to the wheel rotation braking device for providing a fluid path between the inlet receiving the greatest fluid pressure and the wheel braking device;
   first and second low pressure hydraulic fluid returns;
   first and second anti-lock braking modules;
   a first normally open hold valve between the source master cylinder and the first shuttle valve inlet for selectively opening and closing a fluid flow path from the source master cylinder to the shuttle valve;
   a second normally open hold valve between the source master cylinder and the second shuttle valve inlet for selectively opening and closing a fluid flow path from the source master cylinder to the shuttle valve;
   a first normally closed decay valve between the first shuttle valve inlet and the first low pressure return for selectively opening and closing a fluid flow path from the first shuttle valve inlet to the first return;
   a second normally closed decay valve between the second shuttle valve inlet and the second low pressure return for selectively opening and closing a fluid flow path from the second shuttle valve inlet to the second return;
   a wheel speed sensing device providing an indication of the rotational, speed of the wheel;
   a valve control responsive to an indication of a skid indicative wheel speed irregularity from the sensing device to close the first and second normally open hold valves and open the first and second normally closed decay valves; and
   means for disabling the valve control to allow anti-lock-free braking.

7. The combined brake and anti-lock system for a wheeled vehicle as set forth in claim 6, wherein the means for disabling comprises an operator actuable control.

8. The combined brake and anti-lock system for a wheeled vehicle as set forth in claim 6, wherein the means for disabling comprises an error sensing circuit for monitoring anti-lock system operation.

9. A method of retrofitting an aircraft braking system of the type having two independently operable hydraulic braking circuits, each said braking circuits including a master cylinder for selectively supplying pressurized hydraulic fluid to a corresponding brake actuating mechanism, to incorporate an anti-skid feature, comprising:

introducing two pair of valves, one pair into each of the two hydraulic braking circuits between the master cylinder and corresponding brake actuating mechanism;

normally providing a fluid path, with the first valve of each pair, between a master cylinder and corresponding actuating mechanism and operable against spring bias to block the fluid path between the master cylinder and actuating mechanism, and the second valve of each pair normally closed and opening against spring bias to vent pressurized fluid from the corresponding actuating mechanism to a sump;

providing a system for indicating wheel speed for at least two aircraft, wheels, one wheel controlled by one of the two braking circuits and the other wheel controlled by the other of the two braking circuits;

electronically interconnecting the wheel speed sensing system and pairs of valves to monitor each of the two wheel speeds during aircraft operation, and to close the appropriate first valve and open the corresponding second valve upon sensing a skid indicative wheel speed irregularity of a corresponding wheel; and providing a pilot operable control for selectively disabling the electronic interconnection to fix both pairs of valves in their normal conditions directly hydraulically coupling the master cylinders to their respective brake actuating mechanisms thereby disabling the anti-skid feature.

10. The method of claim 9, wherein the step of introducing includes the introduction of two further pair of valves, one further pair in parallel with a corresponding said pair in each of the hydraulic circuits, and a pair of pressure actuated shuttle valves each coupling one of each parallel valve pair to the corresponding actuating mechanism.

* * * * *